United States Patent [19]
Maruyama et al.

[11] Patent Number: 5,973,090
[45] Date of Patent: Oct. 26, 1999

[54] COLD-SETTING COATING COMPOSITION

[75] Inventors: Yasuomi Maruyama; Akihito Iida; Hiroshi Inukai, all of Aichi, Japan

[73] Assignee: Toagosei Co., Ltd., Tokyo, Japan

[21] Appl. No.: 08/961,682

[22] Filed: Oct. 31, 1997

[51] Int. Cl.$^6$ .................................................... C08F 16/24
[52] U.S. Cl. ........................ 526/247; 526/249; 526/250; 526/254; 526/255; 526/279
[58] Field of Search ..................... 526/249, 247, 526/250, 254, 255, 279

[56] References Cited

U.S. PATENT DOCUMENTS

| | | | |
|---|---|---|---|
| 4,751,114 | 6/1988 | Homma et al. | 526/249 |
| 4,886,862 | 12/1989 | Kuwamura et al. | 526/249 |
| 5,179,181 | 1/1993 | Honma et al. | 526/249 |

FOREIGN PATENT DOCUMENTS

| | | | |
|---|---|---|---|
| 116405 | 6/1986 | Japan . | |
| 6104703 | 4/1987 | Japan . | |
| 2151607 | 6/1990 | Japan | 526/249 |
| 3-35011 | 2/1991 | Japan | 526/249 |
| 3100007 | 4/1991 | Japan | 526/249 |
| 3139580 | 6/1991 | Japan | 526/249 |
| 7305018 | 11/1995 | Japan . | |

*Primary Examiner*—Bernard Lipman
*Assistant Examiner*—N. Sarofim
*Attorney, Agent, or Firm*—Sughrue, Mion, Zinn, Macpeak & Seas, PLLC

[57] ABSTRACT

A cold-setting coating composition comprising: a fulorocopolymer comprising (a) a fluoroolefin monomer unit, (b) a (meth)acrylic ester monomer unit, (c) an organosilicon monomer unit represented by a specific formula, (d) other radically polymerizable monomer unit, proportions of said units (a), (b), (c) and (d) being 5 to 70 mole %, 20 to 80 mole %, 1 to 20 mole % and 0 to 30 mole %, respectively, based on the total mole of the units (a), (b), (c) and (d), and the fluoropolymer having a glass transition (Tg) of 15 to 60° C. a curing catalyst; and an organic solvent. The cold-setting coating composition has excellent weather resistance and stain resistance.

5 Claims, No Drawings

COLD-SETTING COATING COMPOSITION

FIELD OF THE INVENTION

The present invention relates to a cold-setting coating composition having excellent weather resistance and stain resistance.

BACKGROUND OF THE INVENTION

Conventionally it is known that fluororesins have excellent heat resistance, chemical resistance, weather resistance, water repellency, lubricating properties and electrical properties. Of the fluororesins having such properties, a fluorocopolymer obtained by the copolymerization of a fluoroolefin with a vinyl carboxylate, alkyl vinyl ether or the like is soluble in an organic solvent and forms a coating film having excellent properties, so that it has been used for coating building materials as a solvent-type highly weather-resistant paint.

In recent days, a fluorocopolymer having a hydrolyzable silyl group is known and because of its setting property by the humidity in the air, such is preferably used as a cold-setting paint. More specifically, a fluorocopolymer obtained by the copolymerization of a fluoroolefin, a vinyl carboxylate and a hydrolyzable silane monomer, as described in JP-B-6-104703 (the term "JP-B" as used herein means an "examined published Japanese patent publication"), a fluorocopolymer obtained by the copolymerization of a fluoroolefin, a vinyl ether and a hydrolyzable silane monomer, as described in JP-B-1-16405, and the like are known. These polymers are, however, accompanied with the problem that their coating films are easily stained by long-term outdoor exposure.

As a result of extensive investigations to obtain a cold-setting coating composition which has excellent weather resistance, processability, stain resistance and water resistance and is also excellent in adhesion to a substrate to be coated, it has been found that such a cold-setting coating composition can be obtained by using a specific fluorocopolymer different from the conventionally employed fluorocopolymer as described above, leading to the completion of the present invention. The fluorocopolymer used in the present invention has a constitution analogous to a fluorocopolymer which has so far been used as a highly weather-resistant sealant and is obtained by the copolymerization of a fluoroolefin, a (meth)acrylate ester and a hydrolyzable silane monomer, as described in JP-A-7-305018 (the term "JP-A" as used herein means an "unexamined published Japanese patent application"), but the conventional fluorocopolymer of such a constitution has not been used as a paint or a coating composition.

SUMMARY OF THE INVENTION

It has been found by the present inventors that a coating film having high gloss and at the same time having not only excellent weather resistance but also excellent stain resistance, processability and-adhesion to a substrate can be obtained if a coating composition obtained by dissolving, in an organic solvent, a specific fluorocopolymer which is obtained by the copolymerization of a fluoroolefin, a (meth) acrylic ester and a hyrolyzable silane monomer, and a curing catalyst is used. The present invention has been completed based on this finding.

Accordingly, an object of the present invention is to provide a cold-setting coating composition having excellent weather resistance and stain resistance.

According to the present invention, there is provided a cold-setting coating composition comprising:
  a fluorocopolymer comprising
    (a) a fluoroolefin monomer unit,
    (b) a (meth)acrylic ester monomer unit,
    (c) an organosilicon monomer unit represented by the following formula (1):

$$R\text{—}SiX_nY_{3-n} \quad (1)$$

wherein R represents a group having an olefinically unsaturated bond, X represents an alkyl group having 1 to 20 carbon atoms, Y represents a hydrolyzable group and n is 0, 1 or 2, and
    (d) other radically polymerizable monomer unit, proportions of the units (a), (b), (c) and (d) being 5 to 70 mole %, 20 to 80 mole %, 1 to 20 mole % and 0 to 30 mole %, respectively, based on the total mole of the units, and the fluorocopolymer having a glass transition (Tg) of 15 to 60° C.;
  a curing catalyst; and
  an organic solvent.

DETAILED DESCRIPTION OF THE INVENTION

Examples of the fluoroolefin (a) used in the present invention include tetrafluoroethylene, chlorotrifluoroethylene, hexafluoropropylene, dichlorodifluoroethylene, trifluoroethylene, vinylidene fluoride, vinyl fluoride and perfluoro-(alkyl vinyl ether). From the standpoint of polymerizability, tetrafluoroethylene, chlorotrifluoroethylene, hexafluoropropylene and trifluoroethylene are preferred, with tetra-fluoroethylene, chlorotrifluoroethylene and trifluoroethylene being more preferred.

The (meth)acrylic ester (b) used in the present invention preferably contains as an alcohol residue an alkyl group having 1 to 20 carbon atoms, an alicylic alkyl group or a halogen-containing alkyl group. An alicylic alkyl (meth) acrylate and a mixture of an alicyclic alkyl (meth)acrylate and an alkyl (meth)acrylate is more preferred.

It is also possible to use as an alcohol residue of a (meth)acrylic ester those containing oxygen, nitrogen, sulfur or the like in an amount not impairing the physical properties of the resulting fluorocopolymer of the present invention.

Specific examples of the (meth)acrylic ester (b) include alkyl (meth)acrylates such as methyl (meth)acrylate, ethyl (meth)acrylate, propyl (meth)acrylate, isopropyl (meth) acrylate, butyl (meth)acrylate, isobutyl (meth)acrylate, s-butyl (meth)acrylate, t-butyl (meth)acrylate, neopentyl (meth)acrylate, ethylhexyl (meth)acrylate, isodecyl (meth) acrylate, lauryl (meth)acrylate, tridecyl (meth)acrylate and stearyl (meth)acrylate; alicyclic alkyl (meth)acrylates such as cyclohexyl (meth)acrylate, isobornyl (meth)acrylate, tricyclodecynyl (meth)acrylate and tetrahydrofurfuryl (meth) acrylate; methoxyethyl (meth) acrylate; dimethylaminoethyl (meth)acrylate; and chloroethyl (meth)acrylate.

Of the above acrylic esters and methacrylic esters, alkyl acrylates are preferred because of their excellent copolymerizability with the fluoroolefin and also flexibility of the resulting copolymer.

The component (c) is an organosilicon monomer represented by the following formula (1):

$$R\text{—}SiX_nY_{3-n} \quad (1)$$

wherein R represents a group having an olefinically unsaturated bond, X represents an alkyl group having 1 to 20 carbon atoms, Y represents a hydrolyzable group, and n is 0, 1 or 2.

Specific examples of R in the above formula (1) include a vinyl group, an allyl group, a butenyl group, a vinyloxy group, an allyloxy group, an acryloyl group, a methacryloyl group, $CH_2=CHO(CH_2)_3-$, $(CH_2=CHCOO(CH_2)_3-$, $CH_2=CHOCO(CH_2)_3-$, $CH_2=C(CH_3)COO(CH_2)_3-$ and $CH_2=C(CH_3)COO(CH_2)_2-O-(CH_2)_3-$, with a vinyl group being more preferred.

Specific examples of X include methyl, ethyl, propyl, octyl and octadecyl groups.

Specific examples of Y include alkoxy, amino, acyloxy, phenoxy, mercapto and iminooxy groups, with an alkoxy group being more preferred.

In the above formula (1), when a plurality of Xs or Ys are used, Xs or Ys may be the same or different groups.

Specific examples of an alkoxy group for Y include methoxy, ethoxy, propoxy, butoxy and methoxyethoxy groups, with methoxy and ethoxy groups being more preferred.

Examples of the other radicallly polymerizable monomer (d) include, but are not limited to thereto, α-olefins such as ethylene, propylene and isobutylene; chloroethylenes such as vinyl chloride and vinylidene chloride; alkyl vinyl ethers such as ethyl vinyl ether, isopropyl vinyl ether, n-butyl vinyl ether, t-butyl vinyl ether and cyclohexyl vinyl ether; and vinyl carboxylates such as vinyl propionate, vinyl caproate, vinyl pivalate, "Veova 9" (trade name; product of Shell Chemicals), vinyl cyclohexancarboxylate and vinyl benzoate.

If the amount of the fluoroolefin monomer unit (a) in the fluorine copolymer of the present invention exceeds 70 mole %, the solubility of the fluorocopolymer is lowered. On the other hand, if the amount is less than 5 mole %, the weather resistance of the fluorocopolymer deteriorates. If the amount of the (meth)acrylate monomer unit (b) in the fluorocopolymer of the present invention exceeds 80 mole %, the water resistance of the fluorocopolymer is lowered, while if the amount is less than 20 mole %, the adhesion of the fluorocopolymer to a material to be coated is decreased. If the amount of the organosilicon monomer unit (c) in the fluorocopolymer of the present invention exceeds 20 mole %, the adhesion of the fluorocopolymer to a material to be coated is decreased, while if the amount is less than 1 mole %, the weather resistance of the fluorocopolymer deteriorates. If the amount of the other radically polymerizable monomer unit (d) exceeds 30 mole %, the weather resistance of the fluorocopolymer deteriorates.

The fluorocopolymer used in the present invention preferably comprises 15 to 60 mole % of a fluoroolefin monomer unit (a), 40 to 75 mole % of a (meth)acrylic ester monomer unit (b), 2 to 10 mole % of an organosilicon monomer unit (c) and 0 to 30 mole % of other radically polymerizable monomer unit (d).

The fluorocopolymer used in the present invention has a Tg of 15 to 60° C. When Tg is lower than 15° C., the stain resistance of the coating film is decreased. On the other hand, if it exceeds 60° C., the flexibility of the coating film is lowered. The term "Tg" as used herein means the Tg of a polymer before setting as measured by DSC (differential scanning calorimeter).

In the present invention, the Tg of the fluorocopolymer can generally be adjusted by the kind or amount of the above-exemplified (meth)acrylic esters. For example, when the proportion of the fluoroolefin monomer unit is about 30 mole % and that of the organosilicon monomer unit is about 5 mole %, the proportion of the (meth)acrylic ester monomer unit becomes about 65 mole %. In such an embodiment, cyclohexyl acrylate or a mixture of isobornyl acrylate and methyl acrylate can be used as the (meth)acrylic ester.

In addition, It is preferred for the fluorocopolymer to have a number average molecular weight (in terms of polystyrene) of 3,000 to 100,000, and preferably 5,000 to 50,000, as measured by gel permeation chromatography (hereinafter abbreviated as "GPC"). If the molecular weight thereof exceeds 100,000, workability is lowered, and if it is less than 3000, the strength of the coating film deteriorates.

The above-described fluorocopolymer can be prepared by the copolymerization of the components (a) to (d) in the presence of a radical polymerization initiator. The polymerization method which can be used is bulk polymerization, suspension polymerization or emulsion polymerization in an aqueous medium, and solution polymerization in an organic solvent.

Examples of the radical polymerization initiator which can be used include peroxides such as diisopropylperoxy dicarbonate, tert-butyl peroxypivalate, benzoyl peroxide and lauroyl peroxide; azo compounds such as azobisisobutyronitrile and azobisisovaleronitrile; and inorganic peroxides such as ammonium persulfate and potassium persulfate. The amount of the initiator used is preferably 0.0001 to 10 parts by weight per 100 parts by the total monomers.

Examples of an emulsifying agent used in the emulsion polymerization include the potassium salt or ammonium salt of perfluorooctanoic acid, the ammonium salt of perfluorooctane sulfonic acid, a sodium salt of a higher alcohol sulfuric ester and polyethylene glycol ether. The a mount of the emulsifying agent used is preferably 0.1 to 50 parts by weight per 100 parts by weight of the total monomers.

Examples of an organic solvent used in the solution polymerization include cyclic ethers such as tetrahydrofuran and dioxane; hydrocarbons such as n-hexane and cyclohexane; aromatic hydrocarbon compounds such as benzene, toluene and xylene; esters such as ethyl acetate and butyl acetate; ketones such as acetone, methyl ethyl ketone and cyclohexanone; alcohols such as ethanol, isopropanol, n-butanol and n-butyl cellosolve; and flons such as 1,1,2-trichloro-1,2,2-trifluoroethylene. They can be used either alone or as mixtures of two more thereof. The organic solvent is preferably used in an amount of 20 to 200 parts by weight per 100 parts by weight of the total monomers.

No particular limitation is imposed on the polymerization conditions, but polymerization is preferably conducted at a temperature of 20 to 100° C. and a pressure of 1 to 200 kg/cm$^2$ for 3 to 40 hours. Monomers used for polymerization may be added at once in a batch-wise manner at an initial stage of the polymerization, or may be added successively in portions with the progress of the polymerization. A pH buffer such as potassium carbonate, sodium bicarbonate, hydrotalcite or an anionic ion exchange resin may be added, if required and necessary.

The coating composition according to the present invention is obtained by dissolving the above-described fluorocopolymer and a curing catalyst therefor in an organic solvent.

The curing catalyst causes hydrolysis of the organosilicon monomer unit (c) in the fluorocopolymer, thereby accelerating the condensation reaction of the resulting silanol group. Examples of compounds which can be used as such a catalyst include cobalt naphthenate, lead naphthenate, calcium octylate, lead octylate, zinc octylate, cobalt octylate, tetrapropyl titanate, tetrabutyl titanate, and organotin compounds such as dibutyltin dilaurate, dioctyltin dilaurate, dichlorodibutyltin, dibutyltin diacetate and triethyltin monostearate. The catalyst is used in an amount of preferably 20 ppm to 5 parts by weight, and more preferably 100 ppm to 1 part by weight, per 100 parts by weight of the fluorocopolymer.

Examples of the organic solvent which can be used include hydrocarbons such as n-hexane, mineral spirit and cyclohexane; aromatic hydrocarbon compounds such as benzene, toluene and xylene; esters such as ethyl acetate and butyl acetate; ketones such as acetone, methyl ethyl ketone and cyclohexanone; and alcohols such as ethanol, isopropanol, n-butanol and n-butyl cellosolve. The organic solvent is used in an amount of preferably 30 to 200 parts by weight, and more preferably 50 to 100 parts by weight, per 100 parts by weight of the fluorocopolymer.

The coating composition of the present invention can contain, as additives, a pigment, a dehydrating agent, an ultraviolet absorber, a fluidity regulating agent, a dispersant, an antioxidant, and an alkyl silicate or oligomer thereof alone or in combination thereof.

Examples of the pigment used in the present invention include inorganic pigments such as titanium oxide, red iron oxide, carbon black and calcined pigment; and organic pigments such as phthalocyanine blue, quinacridone red, and isoindolinone.

Examples of the dehydrating agent which can be used include a trialkyl orthoformate and the like.

Examples of the ultraviolet absorber which can be used include a benzophenone compound, benzotriazole compound, oxalic anilide compound and the like.

The coating composition according to the present invention can be applied to a substrate to be coated, such as metal, plastic, wood, paper or cement, directly or through a primer by spray coating, roll coater or brush coating.

Examples of the metal include SUS, aluminum and galvanized steel plate.

Examples of the plastic include ABS, FRP, PC, rigid PVC, bakelite, epoxy, polyacryl and polyurethane.

Examples of the cement include mortar and architectual concrete.

The present invention is described in more detail by frecence to the following examples, but it should be understood that the invention is not construed as being limited thereto.

EXAMPLE 1

Preparation of Fluorocopolymer:

In a 2-liter autoclave equipped with a stirrer, 150 g of butyl acetate, 12.0 g of cyclohexyl acrylate (hereinafter abbreviated as "CHA"), 5.0 of ethyl acrylate (hereinafter abbreviated as "EA") and 1.5 g of vinyl trimethoxysilane (hereinafter abbreviated as "VMS") were charged, followed by cooling to $-70°$ C. After vacuum deaeration and nitrogen purging were repeated three times, 400 g of chlorotrifluoroethylene (hereinafter abbreviated as "CTFE") were charged in the autoclave. The autoclave was then heated to $58°$ C., and a polymerization initiator solution obtained by dissolving 1.6 g of t-butyl peroxypivalate (hereinafter abbreviated as "NPPV") in 10 g of butyl acetate was injected into thus-heated autoclave, thereby initiating polymerization.

After initiation of the polymerization, a mixed solution of 70 g of butyl acetate, 108.0 g of CHA, 49.0 g of EA and 13.5 g of VMS were pumped into the autoclave over 6 hours at a fixed rate. After 3 hours form starting the polymerization, a solution of 1.6 g of PPV dissolved in butyl acetate was injected into the autoclave. After 7 hours from the initiation of the polymerization, the autoclave was heated to $68°$ C. and polymerization was completed. The total polymerization time was 9 hours.

After the autoclave was cooled, unreacted CTFE was purged, and the autoclave was then opened to obtain a copolymer solution. The resulting solution was filtered, and the filtrate was poured into methanol to separate out a polymer. The polymer was separated from the methanol solution and dried, to obtain 198 g of a fluorocopolymer. The resulting fluorocopolymer had a number average molecular weight (a number average molecular weight in terms of polystyrene as measured by GPC) of 12,000 and Tg of $20°$ C. as measured by DSC.

As a result of elemental analysis of the resulting copolymer, it was found to contain fluorine in an amount of 10.5 wt %. According to $^1$H-NMR and $^{13}$C-NMR, it was confirmed that the copolymer was composed of CTFE, CHA, EA and VMS at a ratio of 24:43:29:4 (mole %).

Preparation of Coating Film:

61.3 Parts by weight of "Tipaque CR-97" (trade name; titanium oxide produced by Ishihara Sangyo Ltd.) were added to 100 parts by weight of the copolymer obtained above, and xylene was then added thereto so as to be a solid content of 50 wt %. 250 Parts by weight of glass beads were added to the resulting mixture, and they were mixed by a paint shaker. The glass beads were removed by a filter cloth. To the residue, 0.3 part by weight of dibutyltin dilaurate was added as a curing catalyst, whereby a white coating composition was prepared.

The resulting white coating composition was applied at a dry thickness of 40 $\mu$m to a chromate-treated aluminum plate having a thickness of 0.6 mm over which an epoxy primer was applied at a thickness of 5 $\mu$m. The physical properties of the coating film thus formed were tested in the following items. The results obtained are shown in the Table below.

Physical Property Test:

1) 60° gloss: Measured in accordance with JIS-K5400.
2) Adhesion to a substrate: The coating films (a) at the initial stage, (b) after dipping in warm water (50° C.) for one week and (c) after dipping in boiling water for 2 hours were subjected to a cross cut test. Each of the coating films on a test piece was notched to form 100 squares, each in area of 1 cm$^2$, and the coating film was then peeled utilizing the adhesive force of a Cellophane tape. The evaluation was made by the number of the squares of 100 squares, remained on the side of the substrate.
3) Weather resistance: Deionized water was sprayed to the coated sample from the reverse side of the coated surface for 4 hours, and the spraying was then stopped for 4 hours. At such a cycle, exposure to a UV weather resistance tester "QUV" (trade name; product of Qpanel Inc.) was carried out continuously for 6,000 hours in total. Indicated is 60° gloss retention (%) after the completion of the test.
4) Flexibility: The test was carried out in accordance with JIS-K5400 and the diameter of the shaft which passed the test is indicated.
5) Stain resistance: Outdoors in an industrial area, a coated substrate was placed with an angle of 45°, and an exposure test was carried out for 5 months. The color difference before and after the test, particularly, a change in L value ($\Delta$L) was measured. The greater the value ($-\Delta$L), the severer the stain.

EXAMPLE 2

Polymerization was started in the same manner as in Example 1 except that only CHA was used as an acrylic ester, 19.4 g of CHA were charged together with the other components, and 480 g of CTFE were then added.

After the initiation of polymerization, polymerization was conducted in the same manner as in Example 1 except that 174.9 g of CHA were charged together with the other components. After drying, 232 g of a copolymer were obtained.

The resulting copolymer had a number average molecular weight of 7,900, and a Tg of 35° C.

As a result of elemental analysis, the resulting copolymer was found to contain fluorine in an amount of 11.8 wt %. According to the same analysis as in Example 1, it was confirmed that the copolymer was composed of CTFE, CHA and VMS at a ratio of 30:66:4 (mole %).

A white coating composition was prepared from the resulting copolymer in the same manner as in Example 1. The physical properties of the coating film formed using the white coating composition were tested in the same manner as in Example 1. The results obtained are shown in the Table below. Fluorocopolymers which will be obtained in the examples described below were also treated in the same manner, and the corresponding coating compositions were prepared. Physical properties of the coating films formed using them were also measured.

EXAMPLE 3

A fluorocopolymer was prepared in the same manner as in Example 1 except for using a mixture of methyl acrylate (hereinafter abbreviated as "MA") and isobornyl acrylate (hereinafter abbreviated as "IBXA") as an acrylic ester.

Amounts of MA and IBXA charged at the initial stage were 9.3 g and 3.7 g, respectively, and amounts of MA and IBXA added after the initiation of polymerization were 83.8 g and 33.4 g, respectively.

The copolymer thus obtained had a weight of 159 g after drying. Further, the copolymer had a number average molecular weight of 9,200 and Tg of 37° C.

As a result of elemental analysis of the resulting copolymer, it was found to contain fluorine in an amount of 13.9 wt %. It was confirmed that the copolymer was composed of monomers, CTFE, MA, IBXA and VMS, at a ratio of 26:60:9:5 (mole %).

A white coating composition was prepared from the resulting copolymer in the same manner as in Example 1.

EXAMPLE 4

Polymerization was started in the same manner as in Example 1 except that a mixture of tertiary butyl acrylate (hereinafter abbreviated as "tBA") and EA was used as an acrylic ester, 3.1 g of tBA and 9.6 g of EA were charged together with other components, 480 g of CTFE were then charged.

Polymerization was conducted in the same manner as in Example 1 except that 27.6 g of tBA and 86.4 g of EA were charged together with the other components (174.9 g in total) after the initiation of polymerization, followed by drying, whereby 159 g of a copolymer was obtained.

The copolymer thus obtained had a number average molecular weight of 15,000 and Tg of 30° C.

The resulting copolymer was found to contain 15.8 wt % of fluorine as a result of the elemental analysis. It was confirmed that the copolymer was composed of CTFE, tBA, EA and VMA at a ratio of 31:13:52:4 (mole %). A white coating composition was prepared from the resulting copolymer in the same manner as in Example 1

COMPARATIVE EXAMPLE 1

CTFE, ethyl vinyl ether (hereinafter abbreviated as "EVE") and VMS were polymerized in butyl acetate at 58 to 68° C. in the same manner as in Example 1, to obtain 245 g of a fluorocopolymer having the following properties.

Number average molecular weight in terms of polystyrene: 12,000

Elemental analysis of fluorine: 26.8 wt % Tg: 20° C. CTFE/EVE/VMS=50/46/4 (mole %)

A white coating composition was prepared from the resulting copolymer in the same manner as in Example 1.

COMPARATIVE EXAMPLE 2

Physical properties of a coating film formed using a white coating composition prepared from a fluorocopolymer having the following properties were measured. V-9 described below means "Veova 9".

Number average molecular weight in terms of polystyrene: 6,800

Elemental analysis of fluorine: 22.6 wt % Tg: 29° C. CTFE/EVE/V-9/VMS=49/24/23/4 (mole %)

COMPARATIVE EXAMPLE 3

Physical properties of a coating film formed using a white coating composition prepared using a fluorocopolymer having the following properties were measured. BA described below means butyl acrylate.

Number average molecular weight in terms of polystyrene: 5,200

Elemental analysis of fluorine: 20.5 wt % Tg: 2° C. CTFE/BA/EA/VMS=41/20/35/4 (mole %)

COMPARATIVE EXAMPLE 4

Physical properties of a coating film formed using a white coating composition prepared from a fluorocopolymer having the following properties were measured.

Number average molecular weight in terms of polystyrene: 6,300

Elemental analysis of fluorine: 12.9 wt % Tg: 68° C. CTFE/IBXA/VMS=38/56/6 (mole %)

TABLE

| | | Adhesion | | | | | |
|---|---|---|---|---|---|---|---|
| | Gloss | Initial stage | After dipping in warm water | After dipping in boiling water | Weather resistance (%) | Flexibility (mm) | Stain resistance (ΔL) |
| Example 1 | 84 | 100/100 | 100/100 | 100/100 | 90 | 2 | −4.1 |
| Example 2 | 85 | 100/100 | 100/100 | 100/100 | 92 | 2 | −3.3 |
| Example 3 | 83 | 100/100 | 100/100 | 100/100 | 82 | 2 | −3.5 |
| Example 4 | 86 | 100/100 | 100/100 | 100/100 | 78 | 2 | −3.8 |
| Comparative Example 1 | 73 | 100/100 | 70/100 | 0/100 | 78 | 2 | −9.3 |
| Comparative Example 2 | 77 | 100/100 | 95/100 | 80/100 | 51 | 2 | −8.3 |
| Comparative Example 3 | 82 | 100/100 | 100/100 | 100/100 | 83 | 2 | −17.3 |
| Comparative Example 4 | 84 | 100/100 | 100/100 | 100/100 | 80 | More than 10 | −4.5 |

While the invention has been described in detail and with reference to specific embodiments thereof, it will be apparent to one skilled in the art that various changes and modifications can be made therein without departing from the spirit and scope thereof.

What is claimed is:

1. A cold-setting coating composition comprising:
a fluorocopolymer comprising
   (a) a fluoroolefin monomer unit,
   (b) an alicyclic alkyl(meth)-acrylate monomer unit, or a mixture of the alicyclic alkyl(meth) acrylate monomer unit and an alkyl(meth) acrylate monomer unit.
   (c) an organosilicon monomer unit represented by the following formula (1):

$$R-SiX_nY_{3-n} \quad (1)$$

wherein R represents a group having an olefinically unsaturated bond, X represents an alkyl group having 1 to 20 carbon atoms, Y represents a hydrolyzable group, and n is 0, 1 or 2 and
   (d) other radically polymerizable monomer unit, proportions of said units (a), (b), (c) and (d) being 15 to 60 mole %, 40 to 75 mole %, 2 to 10 mole % and 0 to 30 mole %, respectively, based on the total moles of the units (a), (b) (c) and (d), and said fluorocopolymer having a glass transition (Tg) of 15 to 60° C.;
a curing catalyst; and
an organic solvent.

2. The cold-setting coating composition as claimed in claim 1, wherein the hydrolyzable group Y in the formula (1) of the monomer unit (c) is methoxy, ethoxy, propoxy, butoxy or methoxyethoxy group.

3. The cold-setting coating composition as claimed in claim 1, wherein said fluorocopolymer has a number average molecular weight of 3,000 to 100,000.

4. The cold-setting coating composition as claimed in claim 1, wherein the curing catalyst is used in an amount of 20 ppm to 5 parts by weight per 100 parts by weight of the fluorocopolymer.

5. The cold-setting coating composition as claimed in claim 1, wherein the organic solvent is used in an amount of 30 to 200 parts by weight per 100 parts by weight of the fluorocopolymer.

* * * * *